US006330529B1

(12) United States Patent
Ito

(10) Patent No.: US 6,330,529 B1
(45) Date of Patent: Dec. 11, 2001

(54) MARK UP LANGUAGE GRAMMAR BASED TRANSLATION SYSTEM

(75) Inventor: Etsuo Ito, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/379,792

(22) Filed: Aug. 24, 1999

(30) Foreign Application Priority Data

Aug. 24, 1998 (JP) ........................................ 10-236850

(51) Int. Cl.[7] ........................................ G06F 17/28

(52) U.S. Cl. ........................................ 704/3; 704/7

(58) Field of Search ........................ 704/2, 3, 4, 5–7; 707/500, 513, 536

(56) References Cited

U.S. PATENT DOCUMENTS

| | | | | |
|---|---|---|---|---|
| 5,408,410 | * | 4/1995 | Kaji | 704/2 |
| 5,644,774 | * | 7/1997 | Fukumochi et al. | 704/2 |
| 5,873,055 | * | 2/1999 | Okunishi | 704/2 |
| 5,966,685 | * | 10/1999 | Flanagan et al. | 704/8 |

* cited by examiner

*Primary Examiner*—Patrick N. Edouard
(74) *Attorney, Agent, or Firm*—Finnegan, Henderson, Farabow, Garrett & Dunner, L.L.P.

(57) ABSTRACT

A translation system and method of translating information, such as a homepage, written in a first language into a second language, when the information is written in accordance with a markup language grammar and provided by an information providing apparatus, such as a server computer connected to the Internet.

34 Claims, 4 Drawing Sheets

MARK UP LANGUAGE GRAMMAR BASED TRANSLATION SYSTEM

FIELD OF THE INVENTION

The present invention relates to a translation system capable of translating information, such as a homepage, written in a first language into a second language, when the information is written in accordance with a markup language grammar and provided by an information providing apparatus, such as a server computer connected to the Internet.

BACKGROUND OF THE INVENTION

As the Internet becomes popularized, great attention is being paid to translation systems connected to the Internet, which translate documents from a first language into a second language. Such systems process information, such as a homepage, written in various languages and can translate the information into a second selected language. Hereafter, the originally obtained information, obtained, for example, via the Internet, is called an original document, while information translated into a user's native language is referred as a translated document.

Problems can occur when a user obtains a translated document through a translation process provided by a communication translation system such as a translation server on the Internet when a user obtains an original document directly from the information providing apparatus and later translates it using a machine translation system installed in the user's system. Because the original document obtained via the Internet needs to be displayed after being processed by an information processing tool for the Internet such as a world wide web (WWW) browser installed in the user's system, the user can not use various supplementary translation functions provided by conventional translation systems. For example, the user can not refer to a specific sentence or word of the original document corresponding to a translated sentence or word of the translated document when the translated document is displayed on the user's system. In addition, the user can not be advised of any other translation words than those that are provided as the default translation words.

SUMMARY OF THE INVENTION

Accordingly, an object of the present invention is to provide an improved translation system capable of translating information written in a first language into a second selected language in accordance with markup language grammar.

The translation system of the present invention comprises a translation system for processing an original document containing display data in a first language in accordance with a markup language grammar to obtain a translated document containing display data in a second language, the translation system comprising a dictionary containing translation data, means for translating the display data of the original document using the dictionary into the display data of the translated document and for providing translation-related data, means for embedding the translation-related data into the translated document, means for storing the translated document embedded with the translation-related data, and means for extracting the embedded translation-related data from the stored translated document and for issuing an instruction to display the extracted translation-related data in addition to the display data of the translated document in response to a request.

Consistent with the present invention, the translation system comprises a translation system that communicates to an information providing apparatus via a network to obtain an original document by a request of a user computer and processes the original document where display data is written in a first language in accordance with a markup language grammar to obtain a translated document where the display data of the translated document is written in a second language, the translation system comprising a dictionary containing translation data, means for translating the display data using the dictionary and for providing translation-related data, means for embedding the translation-related data into the translated document as relevant data, means for communicating to the network, which obtains the original document from the information providing apparatus, the translated document embedded with the translation-related data to the user computer, and means, in the user computer, for extracting the embedded translation-related data from the received translated document and for issuing an instruction to display the extracted translation-related data in addition to the translated display data of the original document.

Consistent with the present invention, a computer-readable memory comprises first instruction means for causing a computer to process an original document where display data is written in a first language in accordance with a markup language grammar to obtain a translated document having display data written in a second language and for providing translation-related data, the original document capable of preserving relevant data in connection with corresponding display data, second instruction means for causing a computer to embed the translation-related data into the translated document as relevant data, third instruction means for causing a computer to extract the embedded translation-related data from the translated document embedded with the translation-related data by a user request, and fourth instruction means for causing a computer to issue an instruction to display the extracted translation-related data in addition to the translated display data of the original document.

Consistent with the present invention, a translation method comprises the steps of translating the display data of the original document using a dictionary into the display data of the translated document and providing translation-related data, embedding the translation-related data into the translated document, storing the translated document embedded with the translation-related data, and extracting the embedded translation-related data from the stored translated document and for issuing an instruction to display the extracted translation-related data in addition to the display data of the translated document in response to a request.

The translation method of the present invention also comprises the steps of translating the display data using a dictionary and providing translation-related data, embedding the translation-related data into the translated document as relevant data, communicating to the network, which obtains the original document from the information providing apparatus, the translated document embedded with the translation-related data to the user computer, and extracting the embedded translation-related data from the received translated document and issuing an instruction to display the extracted translation-related data in addition to the translated display data of the original document.

The present invention also includes a method of reading a computer-readable memory comprising the steps of causing a computer to process an original document where display data is written in a first language in accordance with a markup language grammar to obtain a translated document having display data written in a second language and for providing translation-related data, the original document capable of preserving relevant data in connection with corresponding display data, causing a computer to embed the translation-related data into the translated document as relevant data, causing a computer to extract the embedded translation-related data from the translated document embedded with the translation-related data by a user request, and causing a computer to issue an instruction to display the extracted translation-related data in addition to the translated display data of the original document.

BRIEF DESCRIPTION OF THE DRAWINGS

A more complete appreciation of the present invention and many of the attendant advantages thereof will be readily obtained as the same becomes better understood by reference to the following detailed description, when considered in connection with the accompanying drawings, wherein.

DETAILED DESCRIPTION OF THE INVENTION

Figure 1:
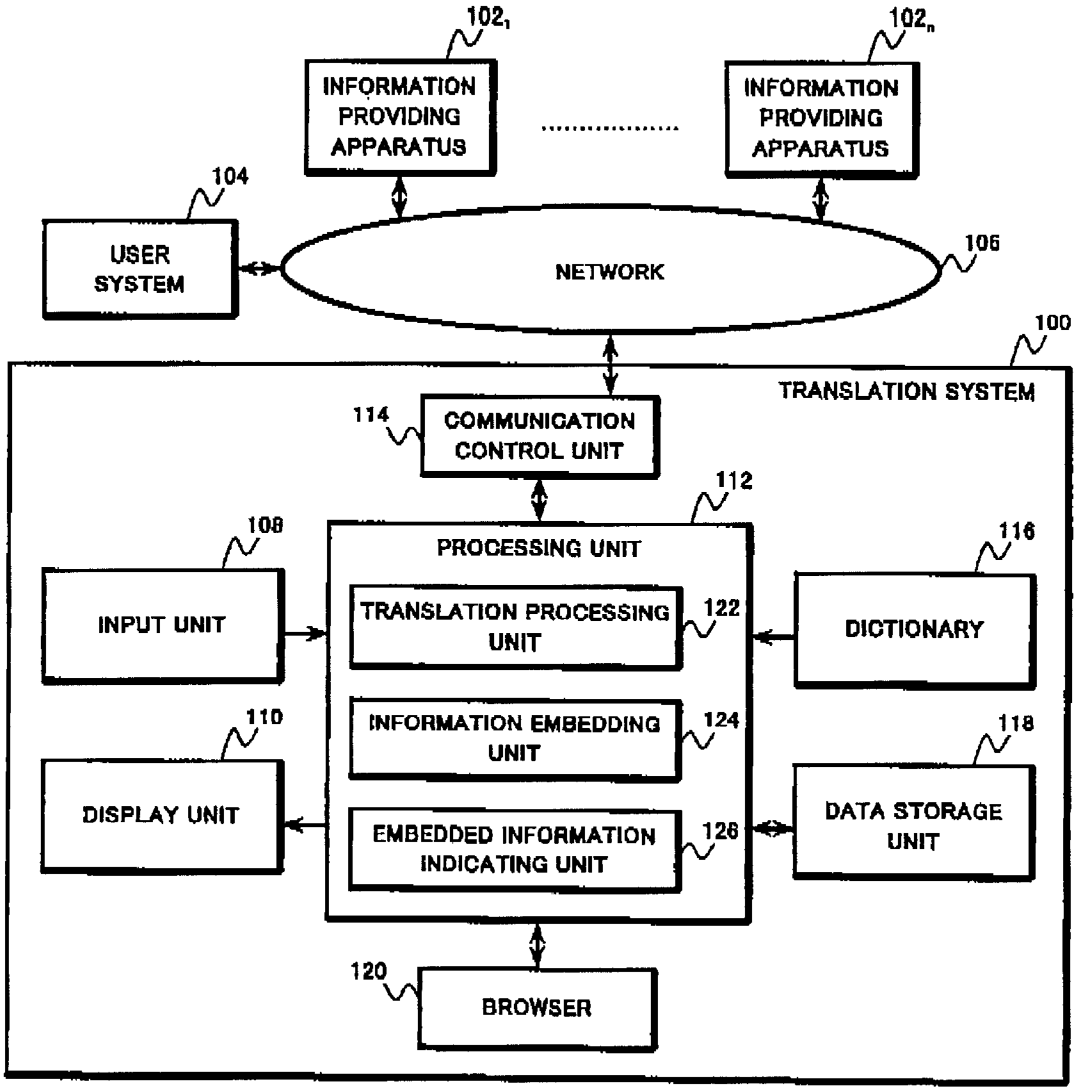
FIG. 1 is a block diagram of a first embodiment of the present invention.
Figure 2:
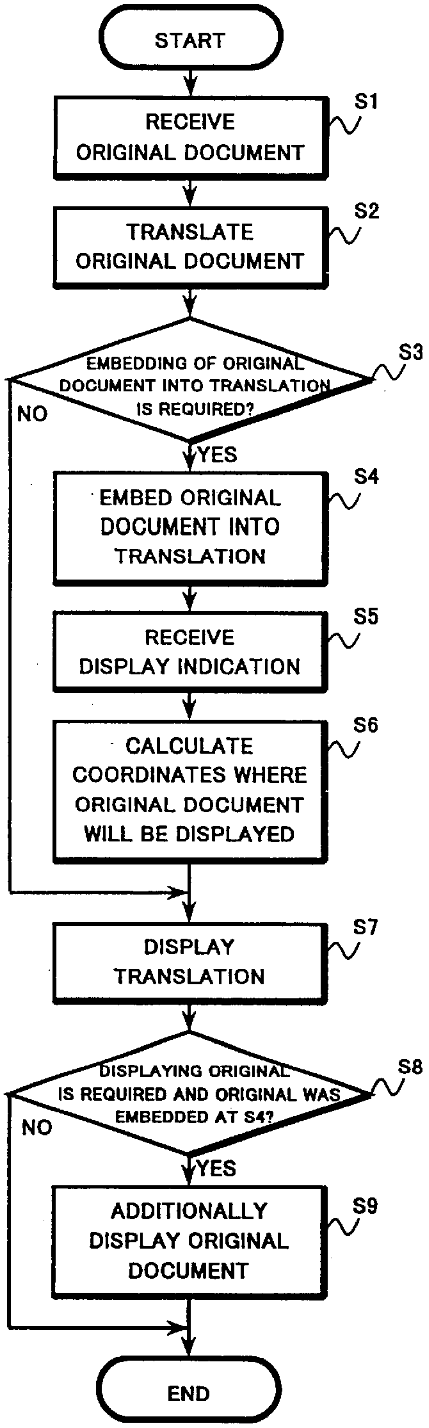
FIG. 2 is a flow chart showing operation of the present invention.

FIG. 1 is a block diagram of a first embodiment of the translation system of the present invention. FIG. 2 is a flow chart illustrating operation of the translation system of the present invention.

As shown in FIG. 1, the translation system 100 is connected or coupled to information providing apparatuses $\mathbf{102}_1$, - - - , $\mathbf{102}_n$ such as homepage server computers and a user system 104 via a network 106, such as the Internet. The information providing apparatuses $\mathbf{102}_1$, - - - , $\mathbf{102}_n$ may provide various types of original documents in response to requests issued by the user system 104. When a user wants to translate an original document written in a first language into a second selected language, the user obtains the original document through a translation process performed by the translation system 100. The translation system 100 first receives the original document from one of the information providing apparatuses $\mathbf{102}_1$, - - - , $\mathbf{102}_n$ via the network 106 and then translates the received original document into a predetermined and selected second language. In accordance with the present invention, the translated language can be selected at the time of translation by the user or can be set as a default.

The translation system 100 comprises an input unit 108, a display unit 110, a processing unit 112, a communication controlling unit 114, a dictionary 116, a data storage unit 118, and a browser 120. The user system 104 may include substantially the same units as the input unit 108, the display unit 110, the communication control unit 114, and the browser 120. Therefore, when a user who has a system that includes an input unit 108, a display unit 110, a communication control unit 114, and a browser 120, uses the translation system 100, which is remote from the user, the user primarily uses the processing unit 112, the dictionary 116, and the data storage unit 118 of the translating system 100. However, a user can also use the translation system 100 where it is set up. For the sake of ease of explanation, hereinafter the present invention is explained on the assumption of the latter case. It should be understood, however, that the present invention can be implemented such that various of the components of translation system 100 are physically located at different sites or at the same site.

The input unit 108 comprises one or more of a keyboard, a mouse, and a scanner. The user issues necessary instructions for acquisition and translation of an original document using input unit 108. The display unit 110 comprises one or more of a CRT, a bit map display, a goggle, and a wall-surface projector, and displays the original document and the translated document. The processing unit 112 includes a CPU, and executes a translation process operation in addition to necessary control operation between the various components of the translation system 100. The communication control unit 114 executes an access control to the network 106. The dictionary 116 stores dictionary data such as translation words and grammar necessary for document translation. The data storage unit 118 stores the received original document, the translated document, and other relevant data such as translation analysis data. The browser 120 interprets the original document and the translated document, and then generates indications for displaying the original and translated documents on display unit 110.

The processing unit 112 further includes a translation processing unit 122, an information embedding unit 124, and an embedded information indicating unit 126. When a user designates the URL of a homepage using the input unit 108 in the process of, for example, viewing another homepage on the display unit 110, the desired original document is provided after the communication control unit 114 accesses the network 106 to request, for instance, the information providing apparatus $\mathbf{102}_1$. The processing unit 112 receives the original document provided from the information providing apparatus $\mathbf{102}_1$ via the communication control unit 114 (step S1) and then temporarily stores the original document in the data storage unit 118.

The translation processing unit 122 then executes the translation process on the original document into the language selected by the user. The translation process is performed by the translation processing unit using the dictionary 116 (step S2). The translation processing unit also generates translation analysis information as well. The translated document and the translation analysis information are temporarily stored in the data storage unit 118.

The original document is written in a markup language such as a hyper text markup language (HTML), a standard generalized markup language (SGML) or an extensible markup language (XML). For the sake of ease of explanation, HTML will be used to describe the present invention, though other markup languages can be used. The original document includes other information such as a set of tags according to the corresponding markup language rules in addition to display data or information, which will be displayed on the display unit 110. The dictionary 116 also contains other information such as alternate translation words, e.g., synonyms, and part of speech information about the dictionary terms. In accordance with one aspect of the present invention, this other information can be stored with the translated document and can, as requested by the user, be displayed with the translated document. The request of the user can be made at the time of the translation or can be set as a default.

The information embedding unit 124 reads out the original document and the translated document, as well as the other information, if appropriate, from the data storage unit 118. The information embedding unit then embeds the original document according to a predetermined unit, such as a sentence or a word, into the translated document using a set of comment tags according to the corresponding markup language rules. This embedding preserves the original document together with the corresponding translated document (step S4). The translated document embedded with the original document is then stored in the data storage unit 118. The browser 120 interprets the translated document embedded with the original document and generates a display indication. In accordance with the present invention, the original document can always be embedded in the translated document by the information embedding unit 124; or it can be embedded in the translated document only when required.

The embedded information indicating unit 126 receives the display indication from the browser 120 (step S5) to determine the coordinate data on the display unit 110 where the translated document will be displayed. The embedded information indicating unit 126 then calculates the coordinates where the corresponding original document will be displayed when required (step S6). The coordinate data of the original document is stored with the corresponding original document in the data storage unit 118. The display unit 110 displays the translated document (step S7). When the user requests that the original document be displayed via the input unit 108 (step S8), the embedded information indicating unit 126 additionally displays the original document read from the data storage unit 118 at the calculated coordinates on the display unit 110 (step S9).

Figure 3:
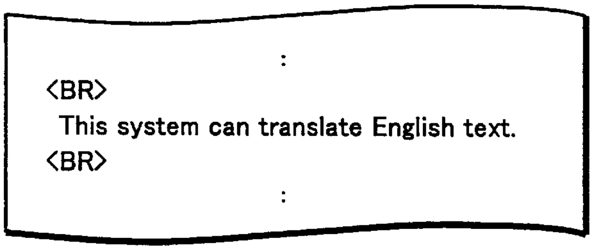
FIG. 3 is an example of a portion of an original document including hyper text markup language (HTML) grammar.

FIG. 3 is an example of an original document in accordance with HTML grammar. Display data or information of the original document, e.g. “This system can translate English text” is written in English. The tags, “<BR>”, are provided as line-feeding tags in accordance with HTML grammar.

Figure 4:
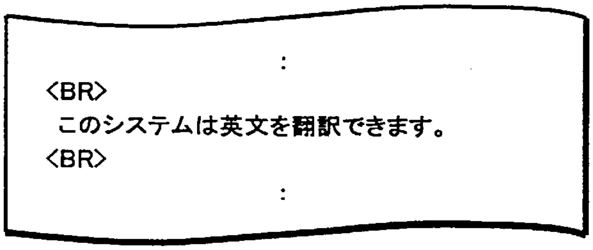
FIG. 4 is an example of a translated document corresponding to the original document in FIG. 3 provided by a conventional translation system.

FIG. 4 is an example of the translated document corresponding to the original document shown in FIG. 3 as provided by a conventional translation system. Display data or information of the translated document, e.g., the translated text written in the selected language, in this instance Japanese, is displayed on the screen. Because the browser 120 interprets the “<BR>” tags, they are not shown on the display unit 110.

Figure 5:
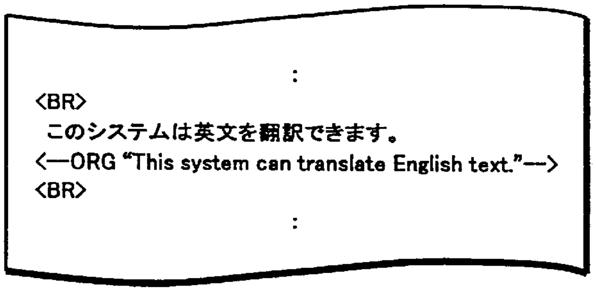
FIG. 5 is a first example of the content of a translated document in accordance with the present invention.

FIG. 5 is a first example of the translated document content in accordance with the present invention. The translated document is written in accordance with the HTML grammar by the translation system 100 shown in FIG. 1. In FIG. 5, display data of the original document, e.g., “This system can translate English text.”, which is put in between a set of tags “<- -” and “- - >” is embedded into the translated document by a predetermined unit, shown as a sentence in FIG. 5. The set of tags “<- -” and “- - >” is provided as a comment tag in HTML grammar. Because the browser 120 interprets the comment tag, it is not displayed on the display unit 110. An “ORG” tag denotes display data of the original document in this embodiment. The embedded information indicating unit 126 interprets the ORG tag and then calculates the coordinates where the display data will be displayed if required.

Figure 6:
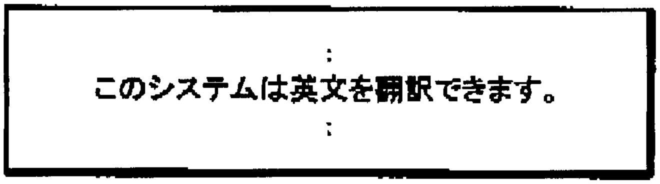
FIG. 6 is an example of a screen display of a translated document in accordance with the present invention.

FIG. 6 is an example of a screen display of a translated document. Both translated documents shown in FIG. 4 and FIG. 5 are displayed on the display unit 110 through the browser 120, as shown in FIG. 6.

Figure 7:
FIG. 7 is an example of a screen display of a sentence of the original document, which is embedded in the translated document, as shown in FIG. 5.

FIG. 7 is an example of a screen display of the display data of the original document, which is embedded into the translated document by a unit of a sentence, as shown in FIG. 5. In FIG. 7, the display data of the original document is additionally displayed at the predetermined location as calculated by the embedded information indicating unit 126. The display data of the original document can be displayed in a predetermined form, such as within a balloon, according to the indication generated by the embedding information indicating unit 126, either automatically or in response to a user request.

Figure 8:
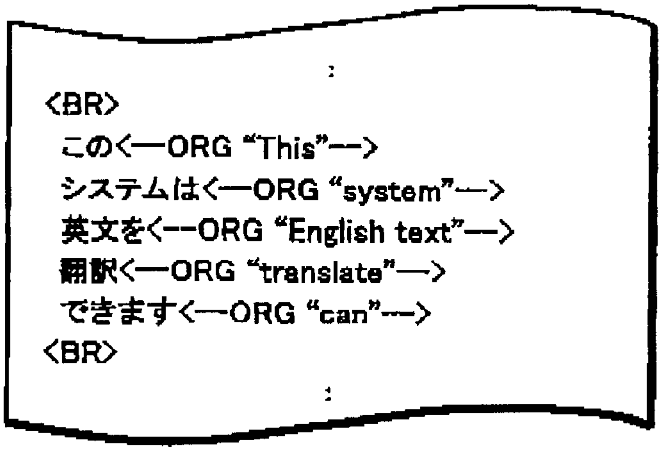
FIG. 8 is a second example of the content of a translated document in accordance with the present invention.

FIG. 8 is a second example of the content of a translated document in accordance with the present invention. In FIG. 8, display data of the original document is embedded into the translated document by a unit of a word. The translated document, shown in FIG. 8, is displayed on the display unit 110 through the browser, as shown in FIG. 6.

Figure 9:
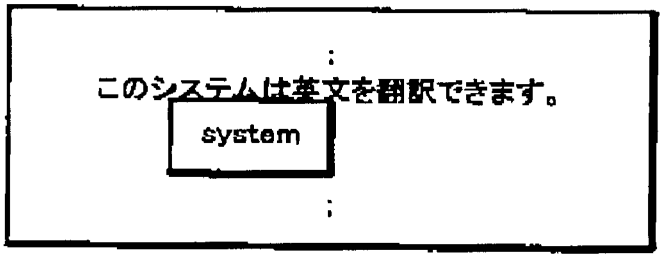
FIG. 9 is an example of a screen display of a word of the original document, which is embedded in the translated document, as shown in FIG. 8.

FIG. 9 shows an example of a screen display of the display data of the original document, which is embedded in the translated document, by a unit of a word, as shown in FIG. 8. The display data of the original document is additionally displayed in the same way described previously.

Figure 10:
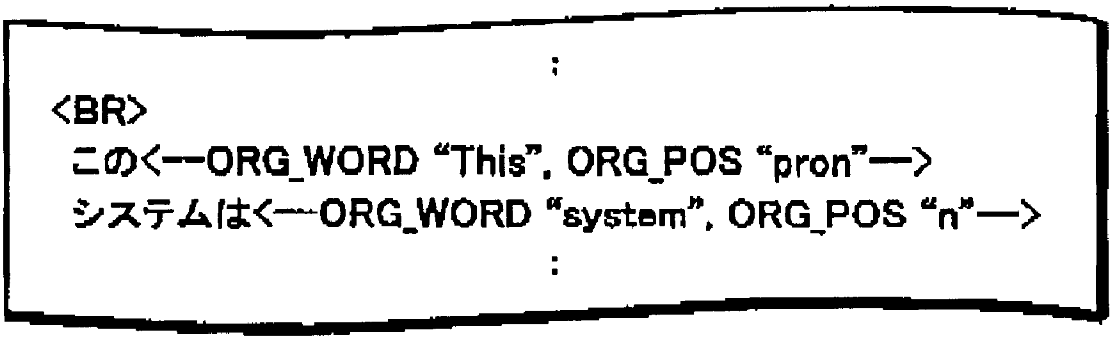
FIG. 10 is a third example of the content of a translated document in accordance with the present invention.

FIG. 10 is a third example of the content of a translated document in accordance with the present invention. In FIG. 10, the various parts of speech (POS), e.g., a pronoun, designated “pron” and a noun, designated “n”, information is included in the display data of the original document, and is generated as part of the translation analysis information by the translation processing unit 122. This information is embedded in addition to the corresponding words, e.g., “this” and “system” of the display data of the original document in the translated document with respect to corresponding Japanese translation words.

Figure 11:
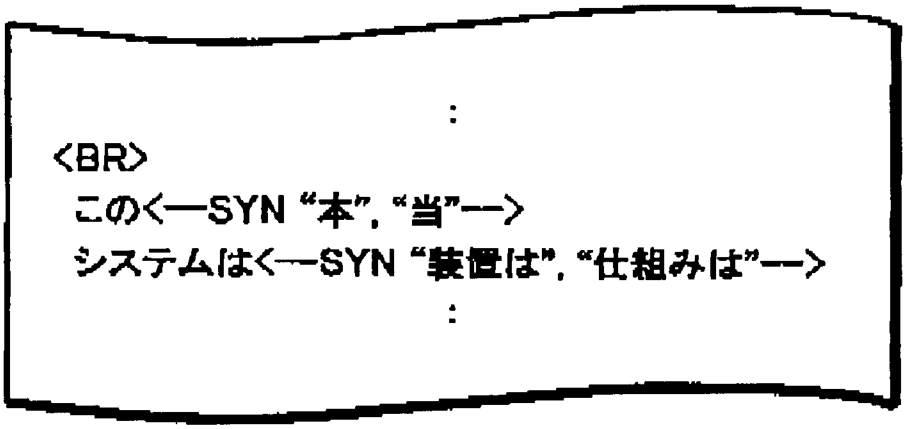
FIG. 11 is a fourth example of the content of a translated document in accordance with the present invention.

FIG. 11 is a fourth example of the content of a translated document in accordance with the present invention. In FIG. 11, alternative Japanese translation words, i.e., synonyms, designated by tag “SYN,” are generated as parts of the translation analysis information by the translation processing unit 122. The alternative translation words are embedded as default translation words. The translated document is displayed on the display 110, as shown in FIG. 6.

Figure 12:
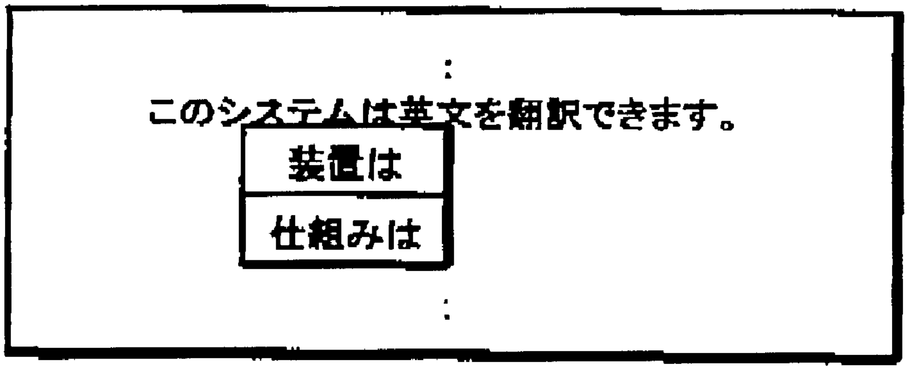
FIG. 12 is an example of a screen display of alternate translation words that are embedded in the translated document, as shown in FIG. 11.

FIG. 12 shows an example of a screen displaying the alternative translation words, which are embedded in the translated document, as shown in FIG. 11. The alternative translation words can be displayed in the same way described previously. Consequently, the user can select the most proper translation word that corresponds to the original word. The default translation words can be updated based on its selection, as is done in conventional machine translation systems.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A translation system for processing an original document containing display data in a first language in accordance with a markup language grammar to obtain a translated document containing display data in a second language, the translation system comprising:

a dictionary containing translation words and grammar;

means for translating the display data of the original document using the dictionary into the display data of the translated document and for providing translation-related linguistic data;

means for embedding the translation-related linguistic data into the translated document using a set of marks according to the markup language grammar, wherein data put between the set of marks is not displayed;

means for storing the translated document embedded with the translation-related linguistic data; and means for extracting the embedded translation-related linguistic data from the stored translated document and for issuing an instruction to display the extracted translation-related linguistic data in addition to the display data of the translated document in response to a request.

2. The translation system of claim 1, wherein the translation-related linguistic data is part or all of the display data of the original document.

3. The translation system of claim 1, wherein the translation-related linguistic data is translation analysis information of the display data of the original document.

4. The translation system of claim 1, wherein the translation-related linguistic data is part of speech information related to the display data of the original document.

5. The translation system of claim 1, wherein the translation-related linguistic data is another translation word for the corresponding word of the display data of the original document.

6. The translation system of claim 1, wherein the translation system is connected to a network, the translation system further comprising:

means for communicating with the network to receive the original document and the request and to send the translated document and the instruction.

7. The translation system of claim 1, wherein the set of marks for a comment is a set of a comment tags according to HTML grammar.

8. A translation system that communicates to an information providing apparatus via a network to obtain an original document by a request of a user computer and processes the original document where display data is written in a first language in accordance with a markup language grammar to obtain a translated document where the display data of the translated document is written in a second language, the translation system comprising:

a dictionary containing translation words and grammar;

means for translating the display data using the dictionary and for providing translation-related linguistic data;

means for embedding the translation-related linguistic data into the translated document using a set of marks according to the markup language grammar, wherein data put between the set of marks is not displayed;

means for communicating to the network, which obtains the original document from the information providing apparatus, the translated document embedded with the translation-related linguistic data to the user computer; and means, in the user computer, for extracting the embedded translation-related linguistic data from the received translated document and for issuing an instruction lo display the extracted translation-related linguistic data in addition to the translated display data of the original document.

9. The translation system of claim 8, wherein the translation-related linguistic data is part or all of the display data of the original document.

10. The translation system of claim 8, wherein the translation-related linguistic data is translation analysis information of the display data of the original document.

11. The translation system of claim 8, wherein the translation-related linguistic data is part of speech information of the display data in the original document.

12. The translation system of claim 8, wherein the translation-related linguistic data is another translation word for the corresponding word of the display data of the original document.

13. The translation system of claim 8, wherein the set of marks for a comment is a set of comment tags according to HTML grammar.

14. A computer-readable memory comprising:

first instruction means for causing a computer to process an original document where display data is written in a first language in accordance with a markup language grammar to obtain a translated document having display data written in a second language and for providing translation-related linguistic data;

second instruction means for causing a computer to embed the translation-related linguistic data into the translated document using a set of marks according to the markup language grammar, wherein data put between the set of marks is not displayed;

third instruction means for causing a computer to extract the embedded translation-related linguistic data from the translated document embedded with the translation-related linguistic data by a user request; and fourth instruction means for causing a computer to issue an instruction to display the extracted translation-related linguistic data in addition to the translated display data of the original document.

15. The computer-readable memory of claim 14, wherein the translation-related linguistic data is part or all of the display data of the original document.

16. The computer-readable memory of claim 14, wherein the translation-related linguistic data is translation analysis information of the display data of the original document.

17. The computer-readable memory of claim 14, wherein the translation-related linguistic data is part of speech information of the display data of the original document.

18. The computer-readable memory of claim 14, wherein the translation-related linguistic data is another translation word for a corresponding word of the display data of the original document.

19. The computer-readable memory of claim 14, further comprising:

fifth instruction means for causing a computer to obtain the original document from an information providing apparatus via a network by another user request.

20. The computer-readable memory of claim 14, wherein the set of marks for a comment is a set of comment tags according to HTML grammar.

21. A translation method for processing an original document containing display data in a first language in accordance with a markup language grammar to obtain a translated document containing display data in a second language, the translation method comprising the steps of:

translating the display data of the original document using a dictionary into the display data of the translated document and providing translation-related linguistic data;

embedding the translation-related linguistic data into the translated document using a set of marks according to the markup language grammar, wherein data put between the set of marks is not displayed;

storing the translated document embedded with the translation-related linguistic data; and extracting the embedded translation-related linguistic data from the stored translated document and for issuing an instruction to display the extracted translation-related linguistic data in addition to the display data of the translated document in response to a request.

22. The translation method of claim 21, wherein the translation-related linguistic data is part or all of the display data of the original document.

23. The translation method of claim 21, wherein the translation-related linguistic data is translation analysis information of the display data of the original document.

24. The translation method of claim 21, wherein the translation-related linguistic data is part of speech information of the display data of the original document.

25. The translation system of claim 21, wherein the translation-related linguistic data is another translation word for the corresponding word of the display data of the original document.

26. The translation method of claim 21, further comprising communicating with a network to receive the original document and the request and to send the translated document and the instruction.

27. The translation method of claim 21, wherein the set of marks for a comment is a set of comment tags according to HTML grammar.

28. A translation method that communicates to an information providing apparatus via a network to obtain an original document by a request of a user computer and processes the original document where display data is written in a first language in accordance with a markup language grammar to obtain a translated document where the display data of the translated document is written in a second language, the translation method comprising the steps of:

translating the display data using a dictionary and providing translation-related linguistic data;

embedding the translation-related linguistic data into the translated document using a set of marks according to the markup language grammar, wherein data put between the set of marks is not displayed;

communicating to the network, which obtains the original document from the information providing apparatus, the translated document embedded with the translation-related linguistic data to the user computer; and extracting the embedded translation-related linguistic data from the received translated document and issuing an instruction to display the extracted translation-related linguistic data in addition to the translated display data of the original document.

29. The translation method of claim 28, wherein the translation-related linguistic data is part or all of the display data of the original document.

30. The translation method of claim 28, wherein the translation-related linguistic data is translation analysis information of the display data of the original document.

31. The translation method of claim 28, wherein the translation-related linguistic data is part of speech information of the display data of the original document.

32. The translation method of claim 28, wherein the translation-related linguistic data is another translation word for a corresponding word of the display data of the original document.

33. The translation method of claim 28, wherein the set of marks for a comment is a set of comment tags according to HTML grammar.

34. A method of reading a computer-readable memory comprising the steps of:

causing a computer to process an original document where display data is written in a first language in accordance with a markup language grammar to obtain a translated document having display data written in a second language and for provicing translation-related linguistic data;

causing a computer to embed the translation-related linguistic data into the translated document using a set of marks according to the markup language grammar, wherein data put between the set of marks is not displayed;

causing a computer to extract the embedded translation-related linguistic data from the translated document embedded with the translation-related linguistic data by a user request; and causing a computer to issue an instruction to display the extracted translation-related linguistic data in addition to the translated display data of the original document.

* * * * *